March 9, 1926.
J. B. J. A. VIGNERON
TRAWLING FISHING GEAR
Filed Sept. 29, 1922
1,575,879
2 Sheets-Sheet 1
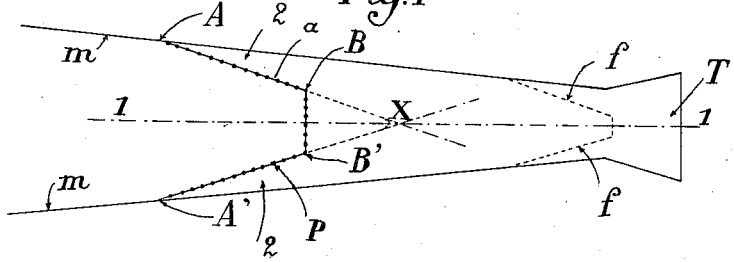
Fig.1
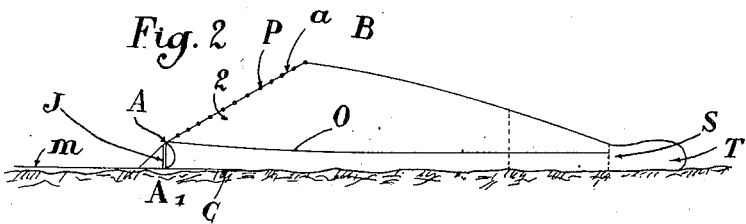
Fig.2
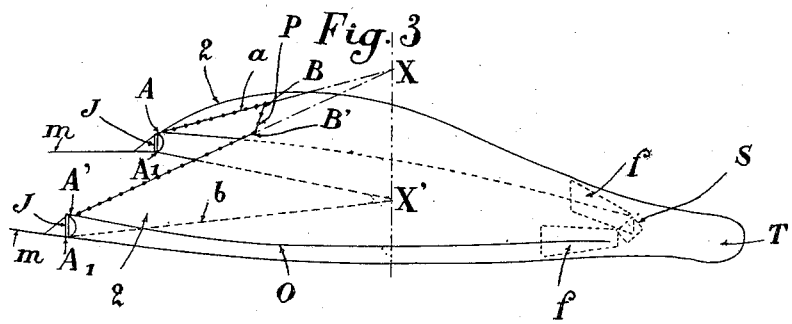
Fig.3
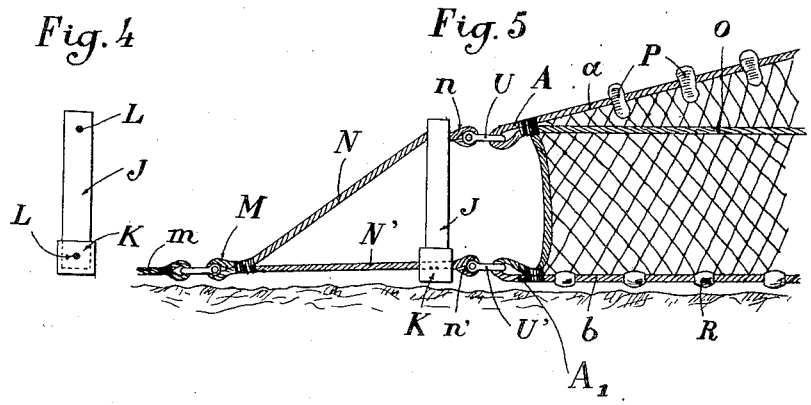
Fig.4
Fig.5
Inventor
Jean-Baptiste Joseph Alphonse Vigneron.
per
Attorney.

March 9, 1926.
J.-B. J. A. VIGNERON
1,575,879
TRAWLING FISHING GEAR
Filed Sept. 29, 1922    2 Sheets-Sheet 2
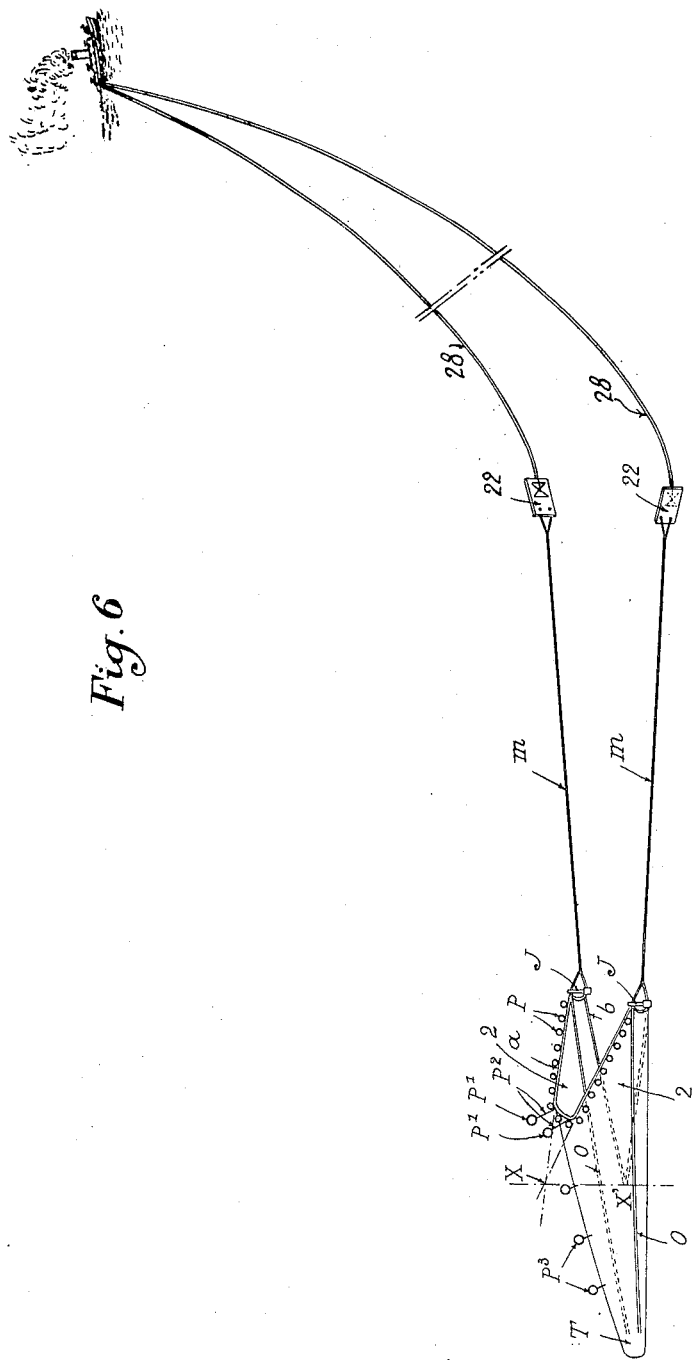
Inventor
Jean-Baptiste Joseph Alphonse Vigneron
per    Attorney.

Patented Mar. 9, 1926.

1,575,879

UNITED STATES PATENT OFFICE.

JEAN-BAPTISTE JOSEPH ALPHONSE VIGNERON, OF MARSEILLE, FRANCE.

TRAWLING FISHING GEAR.

Application filed September 29, 1922. Serial No. 591,321.

*To all whom it may concern:*

Be it known that I, JEAN-BAPTISTE JOSEPH ALPHONSE VIGNERON, manager of the Vigneron, Dahl & Co., citizen of the Republic of France, residing at Marseille, France, 4 Rue Plan Fourmignier, have invented certain new and useful Improvements in Trawling Fishing Gears, of which the following is a specification.

My invention relates to an improved trawling net and it has for its object to provide a ground trawling or drag net possessing all the advantages of the "Ottertrawl" net and of the "Boeuf" net without the objections peculiar to each of these nets.

Another object of my invention is to provide a trawling gear which has a high fishing efficiency and is so constructed that distortion of the net during fishing is practically avoided, the improved gear being in some respects an improvement in the trawling gear described in my U. S. Patent No. 1,440,854, Jan. 2, 1923.

The accompanying drawings illustrate diagrammatically one embodiment of the invention:

Fig. 1 is a plan view of the net according to the invention;

Fig. 2 is a vertical section on line 1—1 of Fig. 1;

Fig. 3 is a perspective view of the net in working position;

Fig. 4 is a front view of one of the slats for keeping the extremities of the wings in the stretched position;

Fig. 5 is a side view of the slat with its connections to the corresponding net wing and to the traction cable.

Fig. 6 is a perspective view of the whole fishing gear.

The net according to the invention is kept open in width by means of two panels or boards 22 (Fig. 6) disposed at a distance from the net and connected to the wings of the same by means of traction cables $m$ of great length, said panels being connected to the boat by towing lines 28. Said arrangement is similar to that described in my U. S. patent above referred to.

The net is kept open in height by floats P or any other buoyancy means disposed on the head rope $a$ of the net to open it in height independently of the opening in width. These buoyancy means may be either fixed upon the head rope (Figs. 5 and 6) or otherwise disposed in detachable sets $P^1$ connected to the head rope of the net by supplementary lines $P^2$. Buoyancy means may also be disposed on the back (top) of the net, so as to increase the opening of the body of the net.

This object may also be obtained by constructing the top sheet and the other parts of the net not in contact with the ground, of more buoyant material than the trawling bottom sheet. The net thus offers less resistance and the meshes work wide open and allow the dirt and small fishes to pass freely. It will be understood that as the head rope is not strained the swelling in height in the body of the net is easily obtained and follows freely the action of the buoyancy means, and panels of comparatively small size may be employed.

The wings 2 of the net are connected to specially formed dismountable stretching or spreading slats J hereinafter described.

The head rope $a$ is of a trapezoidal form A B B' A' and is made of comparatively light rope.

The ground rope $b$ has a pointed shape A X' A' and may be of hemp or manila. This ground rope $b$ may be weighted with leads or metal weights R (Fig. 5).

In order to allow great upward swelling of the net, the top sheet is larger than the bottom sheet when both of said said sheets are mounted on the head rope, ground rope and side cables of the net. For the same purpose, the comparative lengths of the head rope and ground rope differ less than in other known nets; this difference varying from about 18 feet to 21 feet in a net of an ordinary developed length of ground rope of 150 feet; in other words, the ratio of the length of head rope to ground rope is of about 6 to 7.

During operation the lateral sides A' X' of the ground rope $a$ and the lateral sides A B and A' B' of the head rope are located substantially in two vertical planes forming a dihedral angle, the vertical edge X X' of which constitutes a common vertical pivoting axis for both the upper and the lower net portions of the two wings. Consequently when the distance between said wings happens to vary due to uneveness of the sea bottom, or sea streams or other causes, the said upper and lower wing portions will pivot about the same vertical axis X X', thus avoiding any prejudicial deformation or distortion of the net body or reduction of the entrance of the net.

The lateral swelling of the net is limited by side cables O (wing cables); which are connected to the head rope or the spreading slats and adapted to transmit to the net body the towing efforts from the traction cables m. In operation, said side ropes practically form a continuation of the traction cables m whereby the head rope is left entirely free to swell upwardly.

In order to prevent the fish from escaping the proposed net is provided with two vertical intermediate bands or strips of netting f disposed between and fixed to top and bottom in the same place where the ordinary edges of the "Ottertrawl" net are provided and for the same purpose, so as not to prevent the swelling of the net and without crushing the fish with the rubbish collected. The entrance of the pocket T is provided with a veil S.

Each of the traction cables m is connected to the corresponding net wing by means of a dismountable wooden slat J provided with a V shaped cable or crow foot N N¹, as seen in front view in Fig. 4 and in side view Fig. 5.

This slat is provided with holes L through which pass the angle forming connecting cables or strands N N' ending on the opposite side with two eyes n, n' to which are removably attached by means of shackles U U' the ends A A' (Fig. 5) of the head rope a and ground rope b respectively. The two strands N N' are joined together at M round the eye with which engages the traction cable. The strand N is longer than the strand N' so as to facilitate the vertical positioning of the slat in action.

On its lower end the slat J is provided with a metal shoe K which prevents excessive wear of the slat, and by weighting the said shoe it increases the stability of the slat. The bottom of the shoe K rubs upon the sea bottom during the working of the net, and becomes polished, so that after having pulled in the net it may be easily ascertained, by examining the polished surface of the said shoes, whether or not the slats have satisfactorily served their purpose. This permits of adjusting the various parts of the fishing gear in order to improve it for the next operation.

This slat, being dismountable, may be used with all the nets successively worked from one boat.

It is understood that the dimensions, the number and nature of the buoyancy means and the proportions of the different parts may vary according to the particular purposes in view without exceeding the scope of the invention.

I claim:

1. A drag net for ground fishing comprising in combination a substantially conical shaped net body two lateral wings extending forwardly from the body, a head rope of trapezoidal shape, means on said head rope for lifting the same in the water whereby swelling upwards the mouth of the net, and a ground rope of pointed shape, the lateral side portions of the head and ground ropes respectively intersecting on the same vertical line which constitutes a common vertical pivoting axis for both the top and bottom portions of the said wings.

2. In a ground fishing device the combination of a drag net of the type set forth, with two traction cables, two removable wooden spreading slats provided near their upper and lower ends with transversal apertures, two two-stranded lacings, the ends of the two strands of each lacing passing through the said apertures in the slats, means for removably attaching the apex of each lacing to the corresponding traction cables, and means for removably attaching the ends of the upper and lower strands of each lacing respectively to the said head and ground ropes.

3. In a ground fishing device the combination of a drag net of the type set forth, with the two traction cables, two removable wooden spreading slats provided near their upper and lower ends with transversal apertures, metallic shoes covering the lower ends of said slats whereby protecting the latter against rubbing on the sea-bottom, two two-stranded lacings, the ends of the two strands of each lacing passing through the said apertures in the slats, means for removably attaching the apex of each lacing to the corresponding traction cable, and means for removably attaching the ends of the upper and lower strands of each lacing respectively to the said head and ground ropes.

4. In a ground fishing device, the combination of a drag net of the type set forth with two traction cables, two removable spreading slats, two two-stranded lacings, holding means on each spreading slat near the opposite ends thereof, adapted to hold apart the ends of the corresponding lacing, means for removably attaching the apex of each lacing to the corresponding traction cable and means for removably attaching the ends of the upper and lower strands of each lacing to the said head rope and ground rope, respectively.

5. In a ground fishing device, the combination of a drag net of the type set forth with two traction cables, two removable spreading wooden slats, metal shoes covering the lower ends of said slats, two two-stranded lacings, holding means of each spreading slat near the opposite ends thereof, adapted to hold apart the ends of the corresponding lacing, means for removably attaching the apex of each lacing to the corresponding traction cable and means for removably attaching the ends of the upper and lower strands of each lacing to the said head rope and ground rope, respectively.

6. In a ground fishing device, the combination of a drag net formed by a tapering sack provided with lateral wings and comprising a top sheet and a bottom sheet, a ground rope, a head rope, longitudinal side ropes adapted to unite the top sheet and bottom sheet, buoyancy means adapted to raise the head rope of the net, two spreading slats mounted at the ends of the wings and having the head rope, ground rope and side ropes connected thereto, two traction cables of great length, connected to said spreading slats respectively, diverging panels attached to the free ends of the traction cables, a single boat and towing lines for connecting the boat to the diverging panels.

In testimony whereof I affix my signature.

JEAN-BAPTISTE JOSEPH ALPHONSE VIGNERON.